United States Patent [19]

Takano et al.

[11] Patent Number: 5,073,725

[45] Date of Patent: Dec. 17, 1991

[54] OPTICAL HARMONIC GENERATOR

[75] Inventors: Toshihiko Takano, Kashiwa; Yoshio Okada, Kawagoe; Yoshio Inoue, Matsudo; Kouzaburo Yano; Terutaka Tokumaru, both of Kashiwa, all of Japan

[73] Assignee: Sharp Corporation, Tokyo, Japan

[21] Appl. No.: 625,355

[22] Filed: Dec. 11, 1990

[30] Foreign Application Priority Data

Dec. 15, 1989 [JP] Japan .................................. 1-326869

[51] Int. Cl.$^5$ ............................................ H03F 7/00
[52] U.S. Cl. .................................. 307/427; 350/96.12
[58] Field of Search ...................... 307/427; 350/96.12, 350/96.19

[56] References Cited

U.S. PATENT DOCUMENTS

4,932,743 6/1990 Isabe et al. ........................ 350/96.19
5,011,250 4/1991 Okada et al. ......................... 307/427

Primary Examiner—James W. Davie

[57] ABSTRACT

A metal surface plasmon is excited in a multi-layered film composed of thin metal films and a thin dielectric film, by light having a propagation constant larger than that of the incident light emitted from an optical component such as a prism. Due to an extremely strong alternating electric field produced by the electric field enhancement effect of the metal surface plasmon, a harmonic is generated from a nonlinear optical crystal.

7 Claims, 6 Drawing Sheets

OPTICAL HARMONIC GENERATOR

BACKGROUND OF THE INVENTION

The present invention relates to an optical harmonic generator for deriving light (harmonic) with a wavelength which is an integral measure of the wavelength of incident light (fundamental wave) by use of a nonlinear optical effect.

In recent years, with an increase in the availability of small-sized and inexpensive semiconductor lasers, laser-applied devices, such as CD players, video disk devices, and optical disk devices and laser printers as auxiliary devices of a computer, have been developed.

In order to enhance the recording density and operation speed of the laser-applied devices, it is necessary to reduce the wavelength of the laser light used. There is, however, an extreme difficulty in further reducing the wavelength of light emitted from a semiconductor laser.

Conventionally, there has been proposed an optical harmonic generator for converting the wavelength of laser light to a wavelength which is an integral measure of the laser light, by use of a nonlinear optical effect (the phenomenon that the polarization caused in a material by an electric field of light is varied in a nonlinear fashion with an increase in the intensity of the light, due to the interaction between the material and light).

Namely, the conventional device utilizes the phenomenon that a harmonic component of the original light (fundamental wave light) is output due to the nonlinear variation in the polarization when the light is re-emitted by the polarization which is varied in a nonlinear fashion in the material.

However, since the conventional optical harmonic generators based on the above principle are low in conversion efficiency, they have been put to practical use mainly for large-sized lasers such as gas lasers and solid-state lasers by which a sufficiently high light intensity can be obtained.

To apply an optical harmonic generator to a semiconductor laser of which the light intensity is not sufficiently high, however, a high efficiency is required for the optical harmonic generator.

The light intensity of a second harmonic output from an optical harmonic generator capable of generating a second harmonic has the following properties.

(1) The light intensity is proportional to the square of the nonlinear susceptibility of a nonlinear optical crystal and is inversely proportional to the cube of the refractive index thereof.

(2) The light intensity is proportional to the square of the frequency of the fundamental wave light.

(3) The light intensity is proportional to the square of the power density of the fundamental wave light, i.e., to the fourth power of the electric field strength.

(4) The light intensity is proportional to the square of the phase matching length. In some systems, it is proportional to the phase matching length itself.

The light intensity of the harmonic output from an optical harmonic generator capable of generating a third or higher order harmonic has substantially the same properties as described above.

Conventionally, there have been proposed devices in which the electric field strength is increased by using a waveguide structure having an increased phase matching length or a Fabry-Perot resonator structure, as high-efficiency optical harmonic generators.

According to the waveguide type devices, however, the waveguide length must be increased to thereby permit a large phase matching length, making the device extremely large. Further, an extremely high precision of the waveguide structure is required to suppress the attenuation, thus making the manufacture difficult. In addition, since the emitting portion broadens along the waveguide, the profile of the emitted light is deteriorated. Therefore, the devices of this type have the problem of practicability.

On the other hand, according to the resonator type devices, the crystal working precision and temperature setting must be strictly controlled to meet the resonance condition, and thus it is difficult to manufacture the device and to control the temperature during operation. Accordingly, the devices of this type also have the problem of practicability.

An object of this invention is to provide an optical harmonic generator free from the above-described drawbacks.

SUMMARY OF THE INVENTION

According to one aspect of this invention, an optical harmonic generator comprises an optical component for converting incident light into an evanescent wave, a multi-layered film having a thin dielectric film disposed between thin metal films, for exciting a metal surface plasmon by the evanescent wave emitted from the optical component, and a nonlinear optical crystal for generating light having a frequency which is N times (N is an integer larger than 1) the frequency of the incident light by an electric field produced by the metal surface plasmon excited in the multi-layered film.

According to another aspect of this invention, an optical harmonic generator comprises an optical component for converting incident light into an evanescent wave, a multi-layered film having a thin dielectric film disposed between thin metal films, for exciting a metal surface plasmon by the evanescent wave emitted from the optical component, and a nonlinear optical crystal for generating light having a frequency which is N times (N is an integer larger than 1) the frequency of the incident light by an electric field produced by the metal surface plasmon excited in the multi-layered film, wherein the propagation constant of the metal surface plasmon excited in the multi-layered film is smaller than 1/N times the propagation constant of the light propagated through the nonlinear optical crystal and having a frequency N times that of the incident light.

According to still another aspect of this invention, an optical harmonic generating device comprises a laser light source, and an optical harmonic generator which includes an optical component for converting incident light into an evanescent wave, a multi-layered film having a thin dielectric film disposed between thin metal films, for exciting a metal surface plasmon by the evanescent wave emitted from the optical component, and a nonlinear optical crystal for generating light having a frequency which is N times (N is an integer larger than 1) the frequency of the incident light by an electric field produced by the metal surface plasmon excited in the multi-layered film.

According to a further aspect of this invention, an optical harmonic generating device comprises a laser light source, and an optical harmonic generator which includes an optical component for converting incident light into an evanescent wave, a multi-layered film having a thin dielectric film disposed between thin metal films, for exciting a metal surface plasmon by the evanescent wave emitted from the optical component, and a nonlinear optical crystal for generating light having a frequency which is N times (N is an integer larger than 1) the frequency of the incident light by an electric field produced by the metal surface plasmon excited in the multi-layered film, wherein the propagation constant of the metal surface plasmon excited in the multi-layered film is smaller than 1/N times the propagation constant of the light propagated through the nonlinear optical crystal and having a frequency N times that of the incident light.

The objects, advantages and novel features of the present invention will be apparent from the following detailed description when read in conjunction with the appended claims and attached drawings.

DETAILED DESCRIPTION OF THE INVENTION

An optical harmonic generator according to one embodiment of this invention will be described with reference to FIG. 1.

Figure 1:
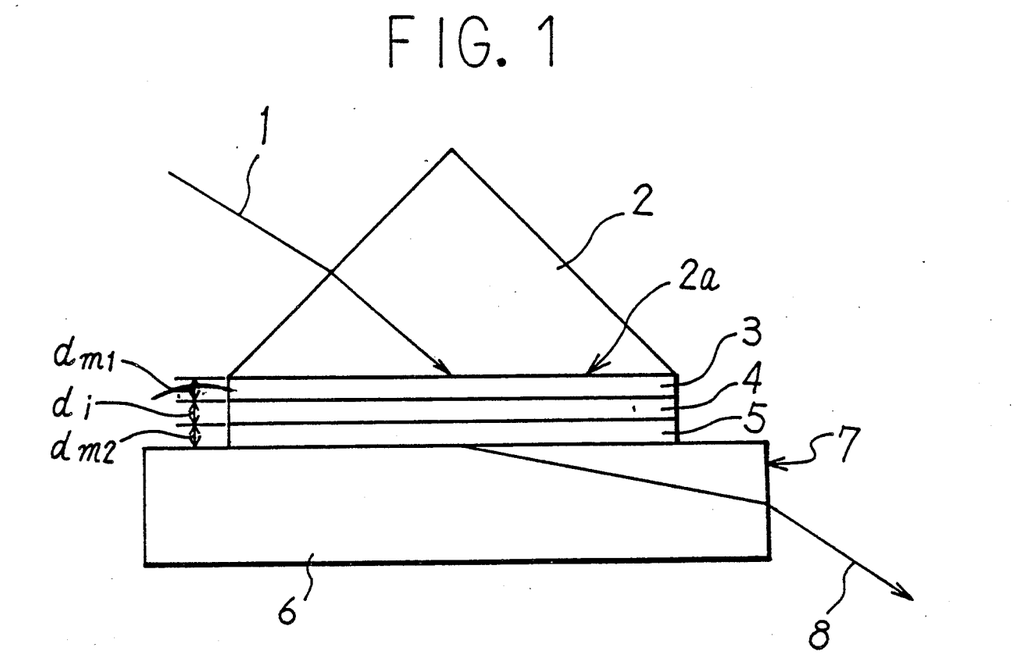
FIG. 1 is a diagram showing the construction of an optical harmonic generator according to one embodiment of this invention.

In FIG. 1, reference numeral 2 denotes a prism constituting an optical component for emitting light having a propagation constant larger than that of incident light, and 6 denotes a nonlinear optical crystal which has been subjected to an optical polishing process. A thin metal film 3, a thin dielectric film 4, and a thin metal film 5, laminated one upon another, are disposed between the bottom surface 2a of the prism 2 and the nonlinear optical crystal 6.

With the above construction, when a P-polarized laser beam 1 as fundamental light (fundamental wave light) is made incident to the bottom surface 2a of the prism 2 at an incident angle greater than the critical angle determined by the refractive indices of the prism 2 and the nonlinear optical crystal 6, light called evanescent wave permeates in each of the thin metal film 3, thin dielectric film 4 and thin metal film 5 disposed under the bottom surface of the prism 2. The evanescent wave is an electromagnetic wave which has a larger propagation constant than normally propagable light, and may be generated by using other optical component such as a diffraction grating, instead of using the total reflection at the bottom surface 2a of the prism 2, described above.

Due to the evanescent wave thus generated, a metal surface plasmon (the quantum of the metal surface plasma oscillation) is excited at the interface between the thin metal film 5 and the nonlinear optical crystal 6. In this case, the wave number of the evanescent wave is made coincident with the propagation constant of the metal surface plasmon determined chiefly by the refractive index and film thickness of the thin metal film 5 and the refractive index of the nonlinear optical crystal 6, so as to strongly excite the metal surface plasmon.

In the case of using the prism 2 as the optical component, the wave number k of the evanescent wave can be expressed by the equation given below, wherein c is the speed of light in vacuum, $\omega$ is an angular frequency, n is the refractive index of the prism 2 for the angular frequency $\omega$, $ko(\omega)$ is the wave number in vacuum for the angular frequency $\omega$, and $\theta$ is an incident angle of the laser beam 1 with respect to the bottom surface 2a of the prism 2.

$$k = n\omega ko(\omega)\sin\theta$$
$$= n\omega \cdot \omega/c \cdot \sin\theta$$

Therefore, by adjusting the refractive index n of the prism 2 and the incident angle $\theta$ of the laser beam 1, it is possible to make the wave number of the evanescent wave coincident with the propagation constant of the metal surface plasmon.

A very strong alternating electric field produced by the electric field enhancement effect of the thus excited metal surface plasmon is applied to a region near the interface between the nonlinear optical crystal 6 and the thin metal film 5. The electric field enhancement effect is the effect that the intensity of an electric field at the interface between the metal and the dielectric film (in this example, the interface between the thin metal film 5 and the nonlinear optical crystal 6) is increased several tens of times that of the incident light. A harmonics 8 is generated at a region near the interface of the nonlinear optical crystal 6 by the alternating field. In particular, the second harmonic is generated at a very high efficiency by the field enhancement effect.

The harmonic 8 generated in this manner is propagated in accordance with the propagation condition of the nonlinear optical crystal 6, and emitted from the end face 7 of the crystal.

Next, the above-described metal surface plasmon and the field enhancement effect will be explained in detail.

When an electromagnetic wave is irradiated onto a thin metal film, a plasma in which conduction electrons and positive ions in the metal are in an ionized state is excited if the frequency and the propagation constant are equal. In this ionized system called plasma, if the equilibrium of charge distribution is disturbed, electrons are collectively moved to maintain the electrically neutral state, thus causing an oscillation. This oscillation is called plasma oscillation.

There also exists a longitudinal wave called surface plasma oscillation other than the aforesaid plasma oscillation (called volume plasma oscillation). The electric field produced by the surface plasma oscillation takes the form of a periodic wave in a direction parallel to the metal surface and takes the form of an extinction wave which exponentially decreases in a direction perpendicular to the metal surface.

The metal surface plasmon is the quantum of the collective motion of electrons causing the excited surface plasma oscillation.

The propagation constant ksp(semi) of the metal surface plasmon propagated at the angular frequency $\omega$ on a plane at which the dielectric contacts a metal having a semi-infinite area can be expressed by the following equation:

$$ksp(semi) = \frac{\omega}{c} \sqrt{\frac{\epsilon m \epsilon i}{\epsilon m + \epsilon i}}$$

where $\epsilon m$ is the relative permittivity of the metal, $\epsilon i$ is the relative permittivity of the dielectric, and c is the speed of light. Here, $\epsilon m$ is a complex number, and accordingly, the propagation constant ksp(semi) also is a complex number. In order to strongly excite the metal surface plasmon, the metal surface plasmon itself must be a wave having a long lifetime. That is, it is necessary to make the imaginary part of the propagation constant ksp(semi) small and suppress the attenuation caused by the propagation. Assuming that $ksp(semi) = ksp' + iksp''$ and $\epsilon m = \epsilon m' + i\epsilon m''$, then the imaginary part of the propagation constant ksp(semi) can be approximated as follows.

$$ksp'' \approx \frac{\omega}{c} \left( \frac{\epsilon m' \epsilon i}{\epsilon m' + \epsilon i} \right)^{3/2} \times \frac{\epsilon m''}{2(\epsilon m')^2}$$

Thus, the factor determining the excitation strength of the metal surface plasmon is $\epsilon m''/(\epsilon m')^2$, and therefore, a metal having a small value of $|\epsilon m''/(\epsilon m')^2|$ is desirably used as a metal for exciting the metal surface plasmon.

For example, the values of $|\epsilon m''/(\epsilon m')^2|$ of various metals for light of 1.1 eV (wavelength: 1.127 $\mu$m) are as follows:

| Metal | $\|\epsilon m''/(\epsilon m')^2\|$ | |
|---|---|---|
| Ag | $1.11 \times 10^{-3}$ | ⎤ |
| Au | $1.26 \times 10^{-3}$ | ⎟ |
| Cu | $1.43 \times 10^{-3}$ | ⎬ metals capable of generating a surface plasmon |
| Al | $1.75 \times 10^{-3}$ | ⎦ |
| Ir | $29.5 \times 10^{-3}$ | |
| Pt | $83.4 \times 10^{-3}$ | |
| Os | $116 \times 10^{-3}$ | |
| W | $500 \times 10^{-3}$ | |

As is understood from the above, the thin metal films 3 and 5 in the embodiment are made of a metal having a value of $|\epsilon m''/(\epsilon m')^2| < 2 \times 10^{-3}$, for example.

Further, the metal surface plasmon is an extinction wave in a direction perpendicular to the metal surface, and thus is a non-radiative electromagnetic wave. Therefore, the electromagnetic energy of the metal surface plasmon usually takes the form of apparent power, as generally used in the field of electrical engineering. Accordingly, the metal surface plasmon excited by light incident from outside can oscillate with a significantly high electric field strength. Particularly, the oscillation intensity of the electric field having a vector perpendicular to the metal surface is strong. This phenomenon is called the field enhancement effect. By optimizing the multilayered structure, an electric field oscillation intensity which is several tens of times that of the incident light can be obtained. That is, the same effect as that obtained in the case where the intensity of the incident light is increased several hundreds to several thousands of times can be achieved.

Since the field enhancement effect is significant in the electric field in a direction perpendicular to the metal surface, a greater nonlinear effect can be obtained by working the nonlinear optical crystal 6 such that the nonlinear polarization axis is perpendicular to the metal surface.

Next, the phase matching condition of the nonlinear optical crystal 6 will be explained in detail.

The field enhancement effect and the condition of propagation of the metal surface plasmon on the threelayered film composed of the thin metal film 3, thin dielectric film 4 and thin metal film 5 can be expressed by using an analytic method generally known as a matrix method.

Assuming now that the relative permittivity of the material constituting the prism 2 or diffraction grating is $\epsilon u$, the relative permittivity of the nonlinear optical crystal 6 is $\epsilon s$, the film thickness and relative permittivity of the thin metal film 3 are $dm_1$ and $\epsilon m_1$, respectively, the film thickness and relative permittivity of the thin dielectric film 4 are $di$ and $\epsilon i$, respectively, and the film thickness and relative permittivity of the thin metal film 5 are $dm_2$ and $\epsilon m_2$, respectively, then the propagation constant ksp of the metal surface plasmon can be obtained as the maximum value of the field enhancement intensity f given by the following equation. In this case, the relative magnetic permeability is 1.

$$f = \left| \frac{2Zu}{m_{12} - Zum_{11} - Zs(m_{22} - Zum_{21})} \cdot \frac{\cos\theta u}{\cos\theta s} \cdot \sin\theta_s \right|$$

where $$Zu = \sqrt{\frac{\epsilon u - \alpha^2}{\epsilon u^2}}$$

$$Zs = \sqrt{\frac{\epsilon s - \alpha^2}{\epsilon s^2}}$$

$$Zm_1 = \sqrt{\frac{\epsilon m_1 - \alpha^2}{\epsilon m_1^2}}$$

$$Zm_2 = \sqrt{\frac{\epsilon m_2 - \alpha^2}{\epsilon m_2^2}}$$

$$Zi = \sqrt{\frac{\epsilon i - \alpha^2}{\epsilon i^2}}$$

$$\alpha = \frac{ksp}{ko}$$

$$\theta u = \arctan\sqrt{\frac{\alpha^2}{\epsilon u - \alpha^2}}$$

$$ko = \frac{\omega}{c}$$

-continued $$\theta_s = \arctan\sqrt{\frac{\alpha^2}{\epsilon_s - \alpha^2}}$$

$$\begin{pmatrix} m_{11} m_{12} \\ m_{21} m_{22} \end{pmatrix} = \begin{pmatrix} \cos(k_{m_2} d_{m_2}) & iZ_{m_2}\sin(k_{m_2} d_{m_2}) \\ \dfrac{i}{Z_{m_2}}\sin(k_{m_2} d_{m_2}) & \cos(k_{m_2} d_{m_2}) \end{pmatrix} \times$$

$$\begin{pmatrix} \cos(k_i d_i) & iZ_i\sin(k_i d_i) \\ \dfrac{i}{Z_i}\sin(k_i d_i) & \cos(k_i d_i) \end{pmatrix} \times$$

$$\begin{pmatrix} \cos(k_{m_1} d_{m_1}) & iZ_{m_1}\sin(k_{m_1} d_{m_1}) \\ \dfrac{i}{Z_{m_1}}\cos(k_{m_1} d_{m_1}) & \cos(k_{m_1} d_{m_1}) \end{pmatrix}$$

$$k_{m_1} = k_o\sqrt{\epsilon_{m_1} - \alpha^2}$$

$$k_{m_2} = k_o\sqrt{\epsilon_{m_2} - \alpha^2}$$

$$k_i = k_o\sqrt{\epsilon_i - \alpha^2}$$

where $\alpha$ is a value corresponding to the refractive index provided that light is propagated in a direction parallel to the surface of the nonlinear optical crystal 6, and is called the equivalent refractive index.

The phase matching condition can be expressed by the relationship between the equivalent refractive index $\alpha$ and the refractive index $n_{n\omega}$ of light propagated in the nonlinear optical crystal 6 and having the angular frequency $n\alpha$.

Figure 2:
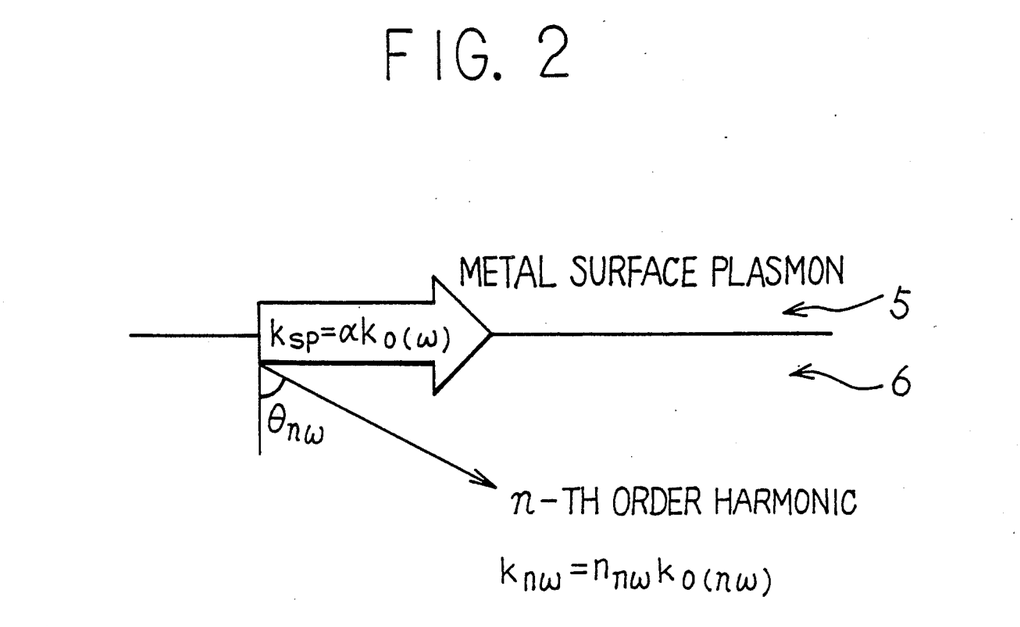
FIG. 2 is a diagram illustrating the phase matching condition.

As shown in FIG. 2, when the equivalent refractive index $\alpha$ is smaller than the refractive index $n_{n\omega}$, the harmonic generated at a region near the interface between the thin metal film 5 and the nonlinear optical crystal 6 can be emitted at an angle $\theta_{n\omega}$. That is, when the harmonic is emitted under this condition, the phase matching condition is satisfied.

The propagation constant ksp of the metal surface plasmon is equal to $\alpha k_o(\omega)$ ($k_o(\omega)$ is the wave number of the fundamental wave with the angular frequency $\omega$ in vacuum), and $\alpha = ksp/k_o(\omega)$. Further, the propagation constant $kn\omega$ of an n-th order harmonic with the angular frequency $n\omega$ propagated in the nonlinear optical crystal 6 is equal to $n_{n\omega}\omega k_o(n\omega)$ ($k_o(n\omega)$ is the wave number of a harmonic with the angular frequency $n\omega$ in vacuum), and $n_{n\omega} = k_{n\omega}/k_o(n\omega) = k_{n\omega}/nk_o(\omega)$. Namely, the phase matching condition is $ksp < k_{n\omega}/n$, as shown by the following expressions.

$$\alpha < n_{n\omega}$$

$$ksp/k_o(\omega) < k_{n\omega}/nk_o(\omega)$$

$$ksp < k_{n\omega}/n$$

In this case, since the fundamental wave with the angular frequency $\omega$ satisfies the total reflection condition, the fundamental wave is prevented from being emitted in the direction of emission of the harmonic.

Figure 3:
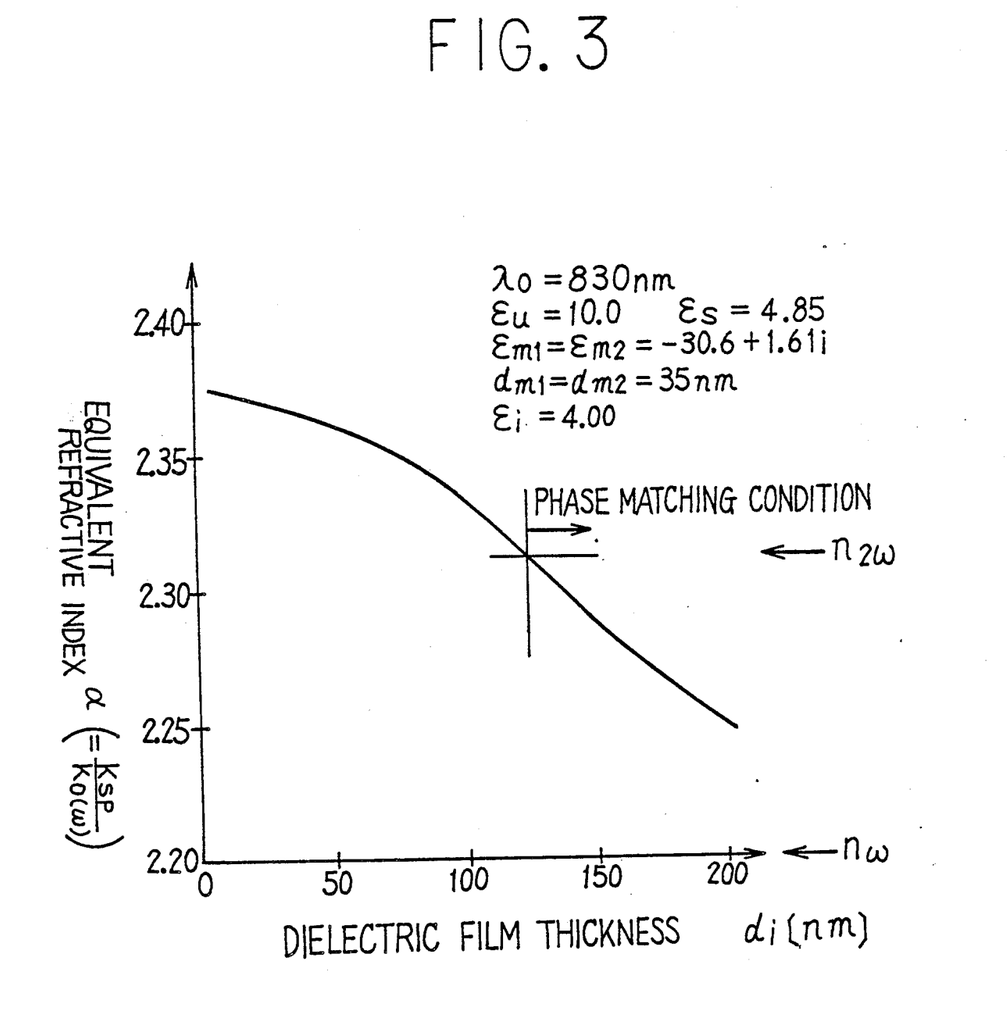
FIG. 3 is a diagram showing a variation in the equivalent refractive index with respect to the film thickness of a thin dielectric film.

FIG. 3 shows a variation in the equivalent refractive index $\alpha$ ($\alpha = ksp/k_o(\omega)$) with respect to the film thickness di of the thin dielectric film 4.

FIG. 3 illustrates the simulation result obtained when a laser beam (wavelength $\lambda_o$ in vacuum: 830 nm) from a semiconductor laser is used as the laser beam 1, lithium niobate LiNbO$_3$ ($\epsilon s = 4.85$) is used for the nonlinear optical crystal 6, silver Ag (dm$_1$=dm$_2$=35 nm, $\epsilon m_1 = \epsilon m_2 = -30.6 + 1.61i$) is used for the thin metal films 3 and 5, aluminum nitride AlN ($\epsilon i = 4.00$) is used for the thin dielectric film 4, and gallium phosphide GaP ($\epsilon u = 10.0$) is used for the prism 2.

The refractive index $n\omega$ of the fundamental wave of the nonlinear optical crystal 6 and the refractive index $n_{2\omega}$ of the second harmonic take the values as indicated by arrows in the graph, and accordingly, the phase matching of the second harmonic can be attained if the film thickness di is set to be equal to or larger than approximately 120 nm where the equivalent refractive index $\alpha$ is $n_{2\omega}$ or less. The equivalent refractive index $\alpha$ is varied in accordance with the film thicknesses and the permittivities of the thin metal films 3 and 5, the permittivity of the thin dielectric film 4, the type and permittivity of the nonlinear optical crystal 6 and the wavelength of the laser beam 1, and the phase matching condition varies accordingly. This is the case with the phase matching condition for the third or higher order harmonic.

Figure 4:
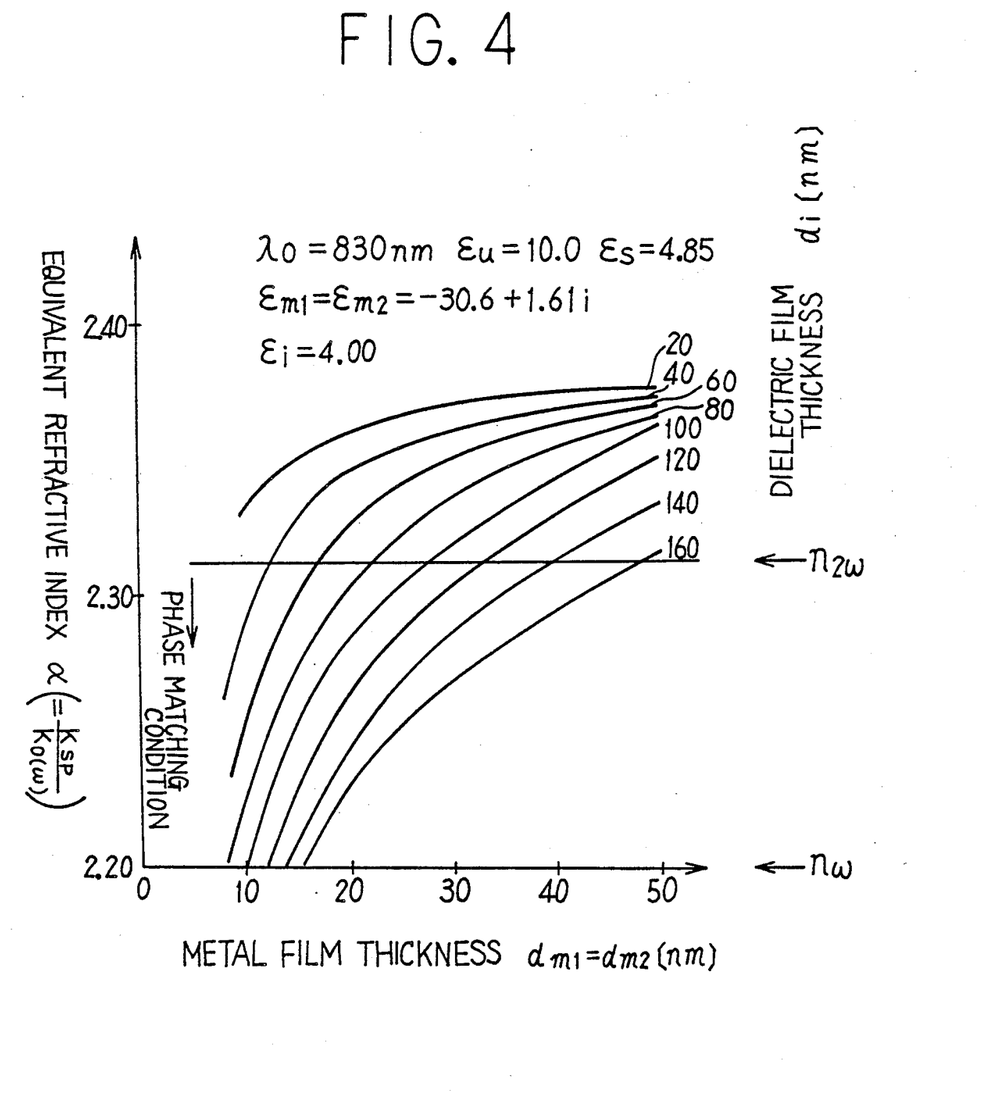
FIG. 4 is a diagram showing variations in the equivalent refractive index with respect to the film thickness of a thin metal film.

FIG. 4 shows a variation in the equivalent refractive index $\alpha(\alpha = ksp/k_o(\omega))$ with respect to the film thicknesses dm$_1$ and dm$_2$ of the thin metal films 3 and 5.

FIG. 4 illustrates the simulation result obtained when a laser beam (wavelength $\lambda_o$ in vacuum: 830 nm) from a semiconductor laser is used as the laser beam 1, lithium niobate LiNbO$_3$ ($\epsilon s = 4.85$) is used for the nonlinear optical crystal 6, silver Ag ($\epsilon m_1 = \epsilon m_2 = -30.6 + 1.61i$) is used for the thin metal films 3 and 5, aluminum nitride AlN ($\epsilon i = 4.00$) is used for the thin dielectric film 4, and gallium phosphide GaP ($\epsilon u = 10.0$) is used for the prism 2.

The refractive index $n\omega$ of the fundamental wave of the nonlinear optical crystal 6 and the refractive index $n_{2\omega}$ of the second harmonic take the values as indicated by arrows in the graph. Accordingly, the phase matching of the second harmonic can be attained by setting the film thicknesses dm$_1$ and dm$_2$ (which vary in accordance with the film thickness di of the thin dielectric film 4) to values such that the equivalent refractive index $\alpha$ is $n_{2\omega}$ or less. The equivalent refractive index $\alpha$ is varied in accordance with the permittivities of the thin metal films 3 and 5, the permittivity of the thin dielectric film 4, the type and permittivity of the nonlinear optical crystal 6 and the wavelength of the laser beam 1, and the phase matching condition varies accordingly. This applies for the phase matching condition for the third or higher order harmonic.

Figure 5:
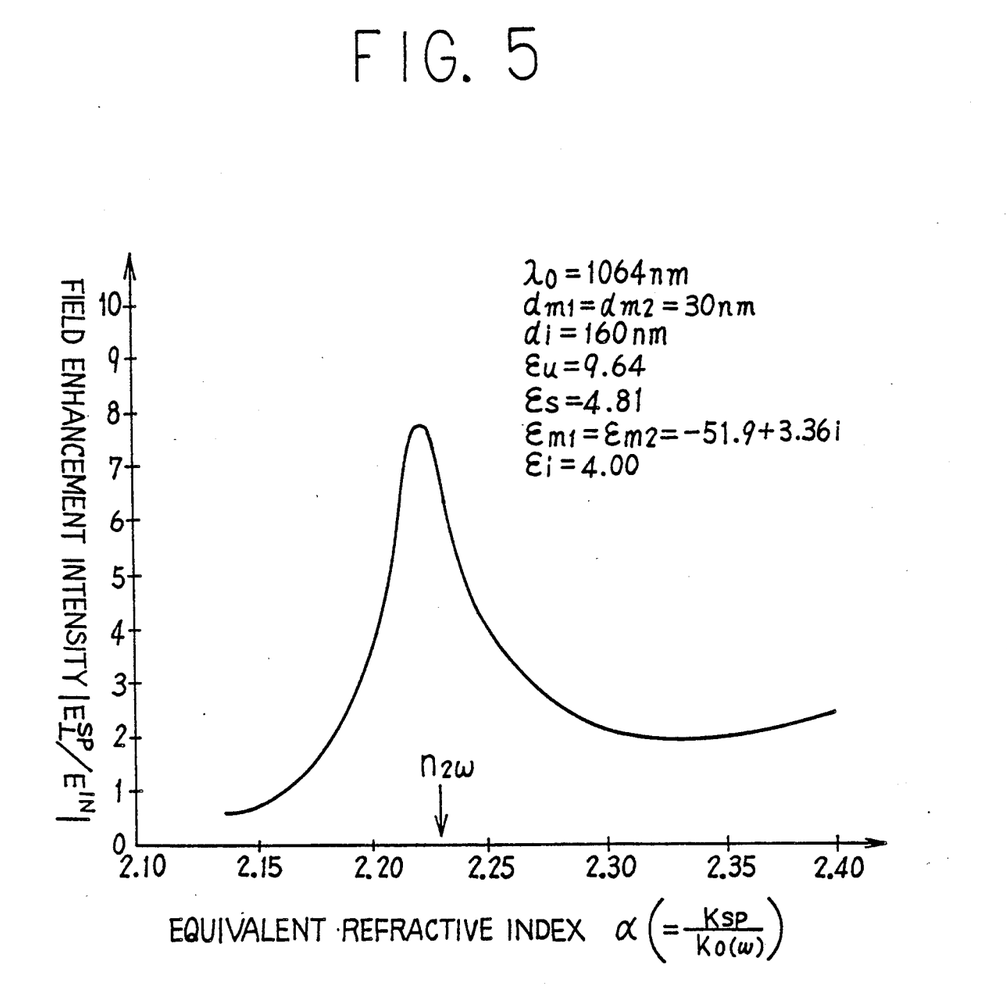
FIG. 5 is a diagram showing a variation in the field enhancement intensity with respect to the equivalent refractive index.

FIG. 5 shows a variation in the field enhancement intensity with the respect to the equivalent refractive index $\alpha$. The field enhancement intensity is expressed in the ratio between the electric field strength $|E\perp^{SP}|$ in a direction perpendicular to the surface of the nonlinear optical crystal 6 caused by the metal surface plasmon and the electric field strength $|E^{IN}|$ of the laser beam 1.

FIG. 5 illustrates the simulation result obtained when a laser beam (wavelength $\lambda_o$ in vacuum: 1064 nm) from a Nd:YAG laser is used as the laser beam 1, lithium niobate LiNbO$_3$ ($\epsilon s = 4.81$) is used for the nonlinear optical crystal 6, silver Ag (dm$_1$=dm$_2$=30 nm, $\epsilon m_1 = \epsilon m_2 = -51.9 + 3.36i$) is used for the thin metal films 3 and 5, aluminum nitride AlN (di=160 nm, $\epsilon i = 4.00$) is used for the thin dielectric film 4, and gallium phosphide GaP ($\epsilon u = 9.64$) is used for the prism 2.

The refractive index $n_{2\omega}$ of the second harmonic from the nonlinear optical crystal 6 takes the value as indicated by an arrow in the graph, and accordingly, it is understood that the maximum value of the field enhancement intensity falls within a range in which the equivalent refractive index $\alpha$ is not larger than $n_{2\omega}$ and at the same time the phase matching condition of the second harmonic is satisfied.

Figure 6:
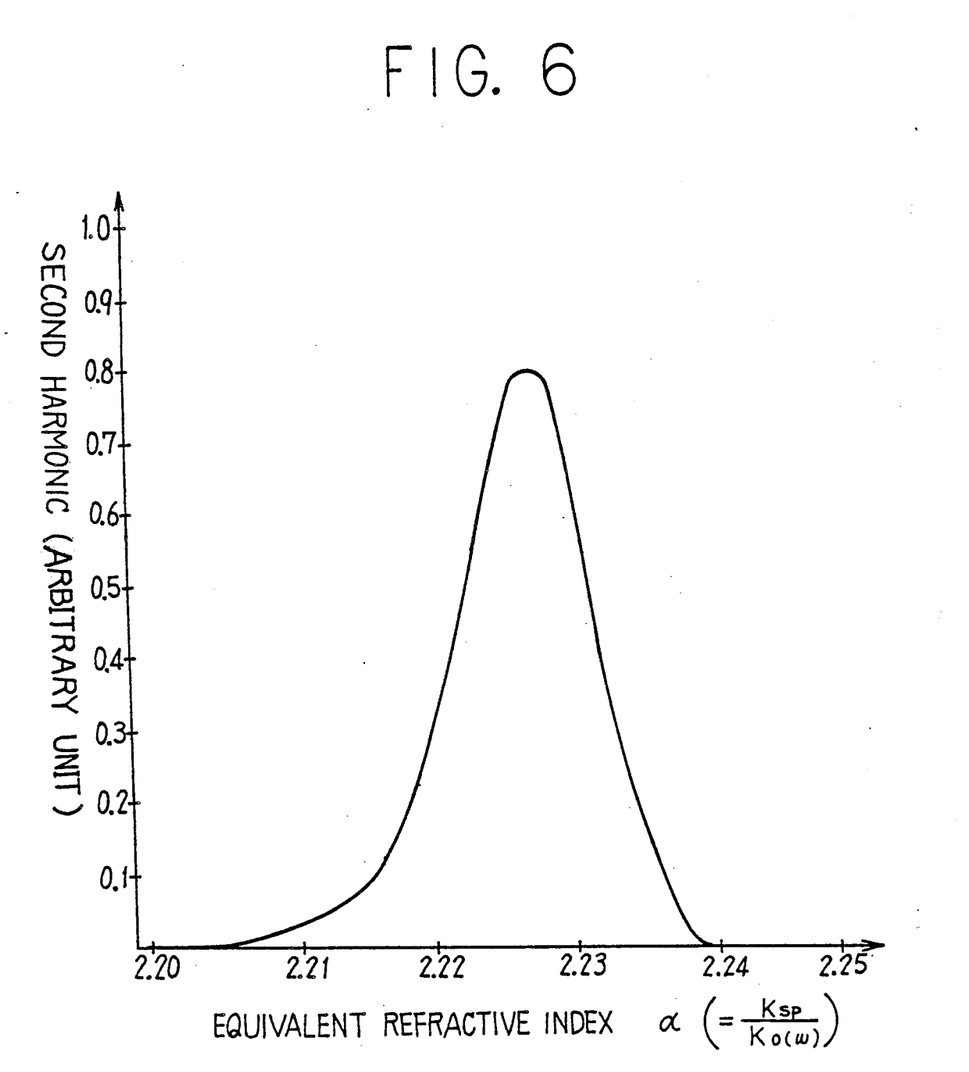
FIG. 6 is a diagram showing a variation in the intensity of the second harmonic with respect to the equivalent refractive index.

FIG. 6 shows the measurement results of the light intensity of the second harmonic (wavelength $\lambda_0 = 532$ nm) obtained by an actual structure produced based on the above simulation. It was confirmed that the second harmonic was generated in a region where the field enhancement effect was observed in the simulation.

FIG. 6 indicates that the light emission range of the second harmonic is considerably wide with respect to the propagation constant ksp. Therefore, it is understood that the optical harmonic generator of this embodiment has a relatively large tolerance with respect to the positional precision of the optical system. The half-width in this arrangement is $\pm 1°$ when represented in terms of incident angle of the laser beam 1 relative to the prism 2.

Figure 7:
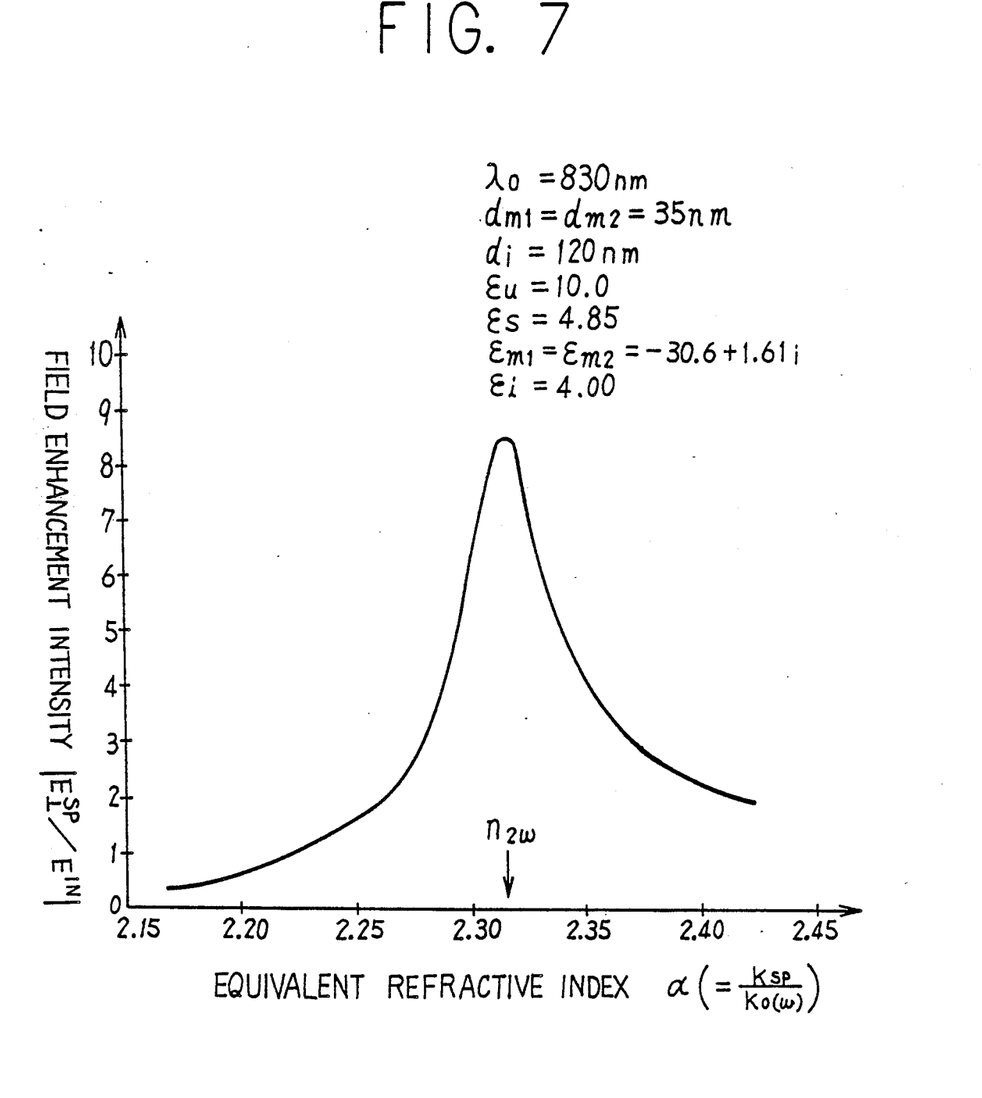
FIG. 7 is a diagram showing a variation in the field enhancement intensity with respect to the equivalent refractive index.

FIG. 7 shows a variation in the field enhancement intensity observed when a laser beam (wavelength $\lambda_0$ in vacuum: 830 nm) from a semiconductor laser is used as the laser beam 1.

FIG. 7 illustrates the simulation result obtained when lithium niobate LiNbO$_3$ ($\epsilon s = 4.85$) is used for the nonlinear optical crystal 6, silver Ag ($dm_1 = dm_2 = 35$ nm, $\epsilon m_1 = \epsilon m_2 = -30.6 + 1.61i$) is used for the thin metal films 3 and 5, aluminum nitride AlN ($di = 120$ nm, $\epsilon i = 4.00$) is used for the thin dielectric film 4, and gallium phosphide GaP ($\epsilon u = 9.64$) is used for the prism 2.

It is understood that, since the refractive index $n_{2\omega}$ of the second harmonic from the nonlinear optical crystal 6 takes the value as indicated by an arrow in the graph, the maximum value of the field enhancement intensity lies in a range in which the equivalent refractive index $\alpha$ is not larger than $n_{2\omega}$ and at the same time the phase matching condition of the second harmonic is satisfied.

A device was actually produced and experimentally operated under the same condition as in the above simulation, and generation of the second harmonic (wavelength: 415 nm) was confirmed.

The materials of the nonlinear optical crystal 6, prism 2, thin metal films 3 and 5, and thin dielectric film 4 are not limited to those described above.

Further, the prism 2 in the embodiment is used as a means for emitting light having a propagation constant larger than that of the incident light, and therefore, other optical component such as a diffraction grating may be used for the purpose.

Moreover, although the above embodiment employs a three-layered structure comprising the thin dielectric film 4 and the thin metal films 3 and 5 sandwiching the film 4, other multi-layered structure having a larger number of thin metal films and thin dielectric films, e.g., five-layered or seven-layered structure, may be used.

Although not shown in the drawings, a lens or the like may be used to converge the laser beam 1 incident to the prism 2, so that the electric field intensity can be further increased and a high-efficiency device can be provided.

As described above, according to this invention, the light intensity of the generated harmonic is increased by intensifying the electric field strength by means of the field enhancement effect of the metal surface plasmon produced at the interface between the thin metal film 5 and the nonlinear optical crystal 6. Accordingly, it is possible to provide a device which is small in size and simple in construction, compared with the conventional device of waveguide type and the conventional high-efficiency device of resonator type. Therefore, the device of this invention can be advantageously used with a semiconductor laser of which the output light intensity is small. Of course, the device of this invention can also be advantageously used with a solid-state laser, gas laser, etc.

Provided that the propagation constant of the metal surface plasmon on the multi-layered film is ksp and the propagation constant of the n-th harmonic (angular frequency: $n\omega$) propagated in the nonlinear optical crystal is $k_{n\omega}$, then the phase matching condition is $ksp < k_{n\omega}/n$. Therefore, by adjusting the incident angle of the incident light and the film thicknesses of the thin metal films and the thin dielectric film constituting the multi-layered film, the propagation constant ksp can be varied, and thus the phase matching condition can be easily satisfied. Further, since the allowable ranges for the optical positional precision and for the precision of the device configuration, such as the film thicknesses, incident angle and the like, are large, the device can be easily manufactured.

Moreover, the fundamental wave satisfies the total reflection condition when the phase matching condition is satisfied, and accordingly, the fundamental wave is prevented from being emitted in the direction in which the harmonic is emitted, whereby the fundamental wave and the harmonic can be satisfactorily separated from each other.

Furthermore, according to this invention, the phase matching condition can be easily satisfied, and it is possible to use, as the nonlinear optical crystal, a bulk single crystal with which the phase matching condition cannot be fulfilled in the prior art.

We claim:

1. An optical harmonic generator comprising:
    an optical component for converting incident light into an evanescent wave;
    a multi-layered film having a thin dielectric film disposed between thin metal films, for exciting a metal surface plasmon by the evanescent wave emitted from the optical component; and
    a nonlinear optical crystal for generating light having a frequency which is N times (N is an integer larger than 1) the frequency of the incident light by an electric field produced by the metal surface plasmon excited in the multi-layered film.

2. An optical harmonic generator comprising:
    an optical component for converting incident light into an evanescent wave;
    a multi-layered film having a thin dielectric film disposed between thin metal films, for exciting a metal surface plasmon by the evanescent wave emitted from the optical component; and
    a nonlinear optical crystal for generating light having a frequency which is N times (N is an integer larger than 1) the frequency of the incident light by an electric field produced by the metal surface plasmon excited in the multi-layered film,
    wherein a propagation constant of the metal surface plasmon excited in the multi-layered film is smaller than 1/N times the propagation constant of the light propagated through the nonlinear optical crystal and having a frequency N times that of the incident light.

3. An optical harmonic generator according to claim 1 or 2, wherein said multi-layered film comprises two thin metal films and a thin dielectric film disposed between the metal films.

4. An optical harmonic generating device comprising:

a laser light source; and an optical harmonic generator which includes an optical component for converting incident light into an evanescent wave, a multi-layered film having a thin dielectric film disposed between thin metal films, for exciting a metal surface plasmon by the evanescent wave emitted from the optical component, and a nonlinear optical crystal for generating light having a frequency which is N times (N is an integer larger than 1) the frequency of the incident light by an electric field produced by the metal surface plasmon excited in the multi-layered film.

5. An optical harmonic generating device comprising:

a laser light source; and an optical harmonic generator which includes an optical component for converting incident light into an evanescent wave, a multi-layered film having a thin dielectric film disposed between thin metal films, for exciting a metal surface plasmon by the evanescent wave emitted from the optical component, and a nonlinear optical crystal for generating light having a frequency which is N times (N is an integer larger than 1) the frequency of the incident light by an electric field produced by the metal surface plasmon excited in the multi-layered film, wherein a propagation constant of the metal surface plasmon excited in the multi-layered film is smaller than 1/N times the propagation constant of the light propagated through the nonlinear optical crystal and having a frequency N times that of the incident light.

6. An optical harmonic generating device according to claim 4 or 5, wherein said laser light source comprises a semiconductor laser.

7. An optical harmonic generating device according to claim 4 or 5, wherein said multi-layered film comprises two thin metal films and a thin dielectric film disposed between the metal films.

* * * * *

UNITED STATES PATENT AND TRADEMARK OFFICE
CERTIFICATE OF CORRECTION

PATENT NO.   : 5,073,725
DATED        : December 17, 1991
INVENTOR(S)  : Toshihiko Takano et al.

It is certified that error appears in the above-identified patent and that said Letters Patent is hereby corrected as shown below:

On the title page: Item [73] change "Tokyo, Japan" to read --Osaka, Japan --.

Signed and Sealed this

Twenty-eighth Day of December, 1993

Attest:

BRUCE LEHMAN

Attesting Officer

Commissioner of Patents and Trademarks